(12) United States Patent
Irwin et al.

(10) Patent No.: US 7,632,125 B2
(45) Date of Patent: Dec. 15, 2009

(54) PLUG LOCKING ASSEMBLY

(75) Inventors: Phillip J. Irwin, Mokena, IL (US);
Gregory L. Kuffel, Plainfield, IL (US);
Robert A. Reid, Monticello, IN (US)

(73) Assignee: Panduit Corp., Tinley Park, IL (US)

(*) Notice: Subject to any disclaimer, the term of this patent is extended or adjusted under 35 U.S.C. 154(b) by 0 days.

(21) Appl. No.: 12/191,450

(22) Filed: Aug. 14, 2008

(65) Prior Publication Data

US 2009/0047818 A1 Feb. 19, 2009

Related U.S. Application Data

(60) Provisional application No. 60/956,491, filed on Aug. 17, 2007.

(51) Int. Cl.
*H01R 13/62* (2006.01)
(52) U.S. Cl. .................. 439/304; 439/540.1; 385/76
(58) Field of Classification Search ............ 439/304, 439/540.1, 344; 385/56, 55, 54, 75, 76, 86; D13/133
See application file for complete search history.

(56) References Cited

U.S. PATENT DOCUMENTS

| | | | |
|---|---|---|---|
| 4,311,883 A | 1/1982 | Kidney | |
| 4,846,708 A | 7/1989 | Marson et al. | |
| 4,870,840 A | 10/1989 | Klein | |
| 4,953,929 A * | 9/1990 | Basista et al. ................. | 385/55 |
| 4,964,284 A | 10/1990 | McDaid | |
| 5,190,465 A | 3/1993 | Davidge et al. | |
| 5,220,815 A | 6/1993 | Davidge et al. | |
| 5,288,241 A | 2/1994 | Davidge et al. | |
| 5,305,380 A | 4/1994 | Hileman et al. | |
| 5,340,324 A | 8/1994 | Fields et al. | |
| 5,420,951 A | 5/1995 | Marazzi et al. | |
| 5,429,522 A | 7/1995 | Noschese et al. | |
| 5,556,295 A | 9/1996 | McFadden et al. | |
| 5,637,002 A | 6/1997 | Buck et al. | |
| 5,675,682 A * | 10/1997 | De Marchi ................. | 385/77 |
| 5,984,705 A | 11/1999 | Miyazaki et al. | |
| 6,250,817 B1 * | 6/2001 | Lampert et al. ............... | 385/56 |
| 6,672,898 B2 * | 1/2004 | Kahle et al. ............. | 439/540.1 |
| 6,799,898 B2 * | 10/2004 | Cheng et al. ................. | 385/56 |
| D503,926 S * | 4/2005 | Marrs ........................ | D13/133 |
| 6,896,535 B2 | 5/2005 | Yamada et al. | |
| 7,234,877 B2 * | 6/2007 | Sedor ......................... | 385/71 |
| 7,325,980 B2 * | 2/2008 | Pepe .......................... | 385/86 |

(Continued)

FOREIGN PATENT DOCUMENTS

DE 8516542 U1 9/1985

(Continued)

*Primary Examiner*—Hae Moon Hyeon
(74) *Attorney, Agent, or Firm*—Robert A. McCann; Christopher S. Clancy

(57) ABSTRACT

A plug locking assembly comprises at least one plug holder comprising opposing top and bottom arms, said top and bottom arms extending tranversely from a wall and defining open spaces therebetween, said open spaces for receiving and holding plugs. The plug holders are typically positioned adjacently to one another or in tandem and the configuration of the opposing top and bottom arms allows for side installation of plugs. The plug locking assembly may further comprise a cover overlying the plug holders.

21 Claims, 12 Drawing Sheets

U.S. PATENT DOCUMENTS

2006/0025003 A1 2/2006 Liao
2006/0040564 A1* 2/2006 Morrison et al. ............ 439/676

FOREIGN PATENT DOCUMENTS

| EP | 1513225 | A2 | 3/2005 |
| EP | 1762871 | A1 | 3/2007 |
| WO | 2007016794 | A1 | 2/2007 |

* cited by examiner

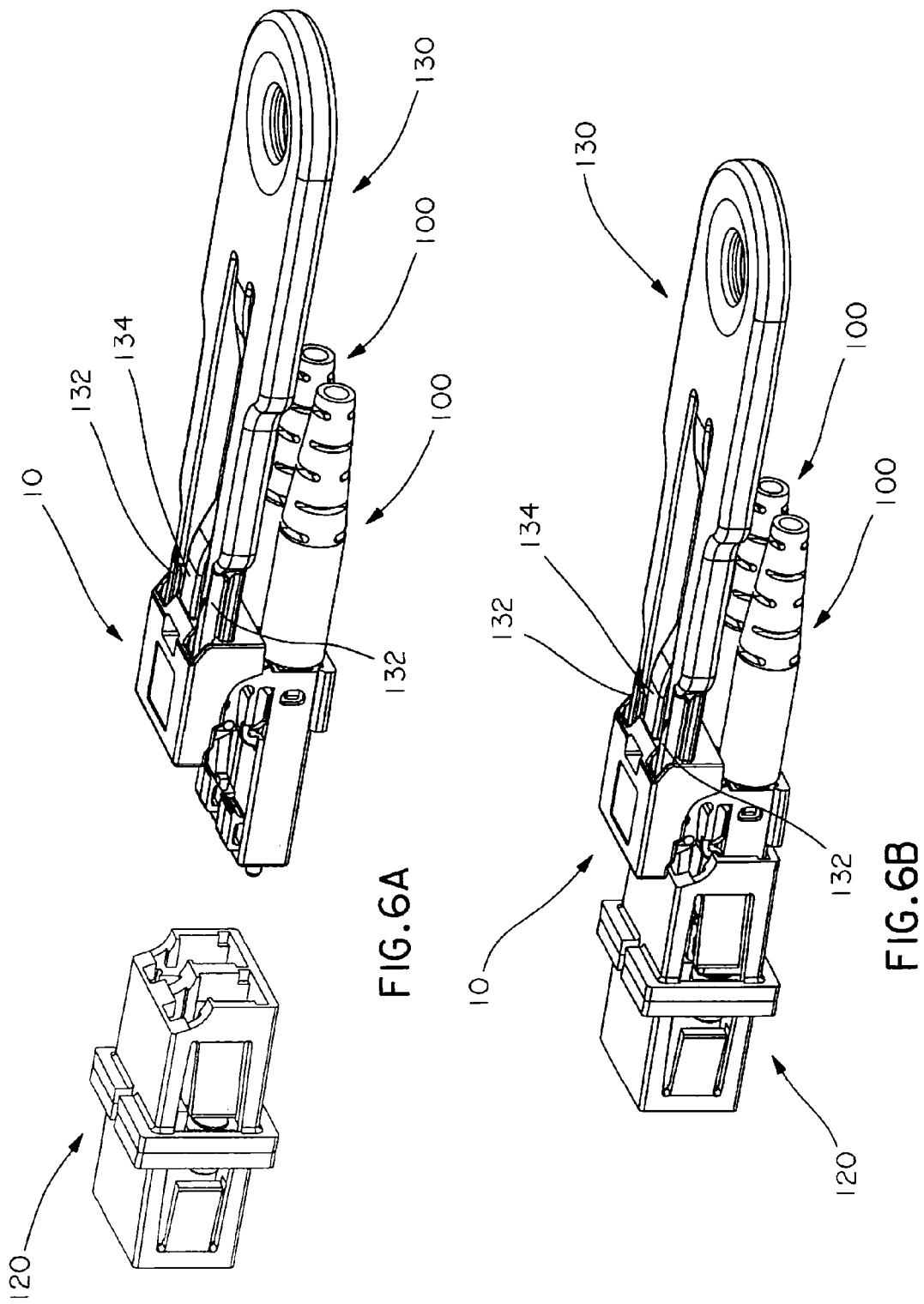

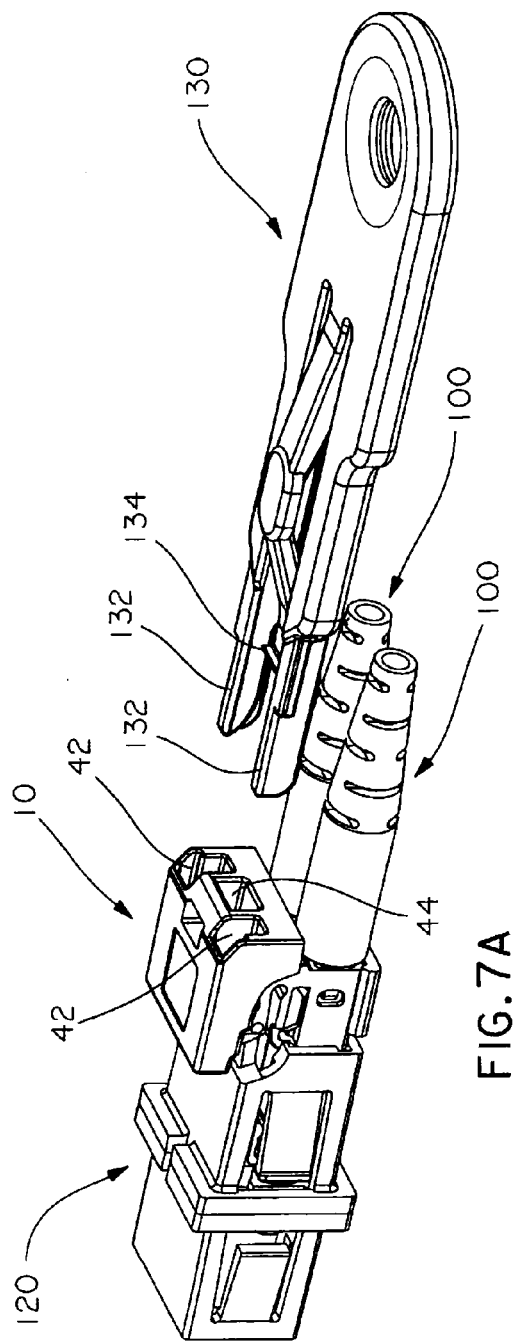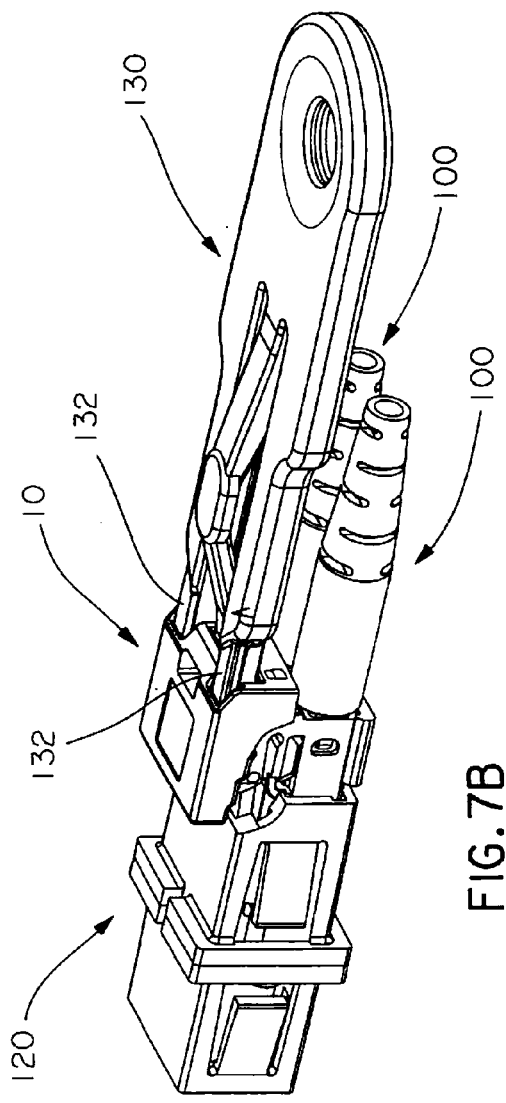
FIG. 7A
FIG. 7B

PLUG LOCKING ASSEMBLY

RELATED APPLICATION

The present patent application claims priority under 35 U.S.C. § 119(e) to U.S. Provisional Patent Application Ser. No. 60/956,491, which was filed Aug. 17, 2007, the full disclosure of which is incorporated herein by reference.

FIELD OF THE INVENTION

This invention relates to a plug locking assembly and, more particularly, to a plug locking assembly comprising securement features for holding a plurality of plugs in position adjacent to each other.

BACKGROUND

Telephones and computers are connected to telecommunications networks through the use of standardized modular connections. These modular connections often rely on the use of plugs secured within jacks. The plugs typically comprise a latch that engages with and secures the plug within the jack. The latch may be depressed to disengage the plug for easy removal from the jack, allowing easy disconnection of a device from a network without using tools. In some cases, the latch may be accidentally depressed or unauthorized users may tamper with the latch, resulting in unwanted removal of the plug from its associated jack.

In some installations, particularly those involving fiber optic connections, two plugs are placed in tandem into a jack with two receptacles. These dual-plug installations are susceptible to accidental latch depression and unauthorized tampering as described above, with the added danger that one removed plug renders the entire two-plug connection non-functional.

There is a need, therefore, to protect installations of plugs and prevent their unintended disconnection from associated jacks.

SUMMARY OF THE INVENTION

An improved plug locking assembly comprises at least one plug holder comprising opposing top and bottom arms, the top and bottom arms extending tranversely from a wall and defining an open space therebetween for receiving and holding plugs.

In one embodiment, the plug locking assembly comprises at least one plug holder comprising top and bottom arms, a depression in a surface of at least one of the top and bottom arms, a retaining wall transverse to at least one of the first and second ends and a wall transverse to the top and bottom arms and connected to one of the first and second ends. The top and bottom arms comprise first and second ends and define an open space therebetween for receiving and retaining plugs. The depression is defined by opposing sidewalls positioned between the first and second ends and is sized and shaped to geometrically conform to at least a portion of the plugs to be inserted. The retaining wall comprises a stop surface for retaining plugs in position after insertion.

In another embodiment, the plug locking assembly comprises at least one plug holder comprising a top arm and a bottom arm, a wall transverse to the top and bottom arms and a cover. The top and bottom arms define a first open space for receiving and holding plugs, with each of the top and bottom arms extending from a first fixed end to a second free end. The second free ends define a second open space for side insertion of plugs. The wall is connected to the top and bottom arms at the first fixed end. The cover overlies the plug holder and blocks topside access to plugs. The cover comprises opposing sidewalls and front and rear end portions, with at least one of the opposing sidewalls comprising a concave surface sloping downwardly into at least one of the front and rear end portions.

In yet another embodiment, the plug locking assembly comprises at least one plug holder comprising top and bottom arms, a wall transverse to the top and bottom arms and a cover overlying the plug holder for blocking topside access to the plug holder. The top and bottom arms extend from a first fixed end to a second free end and define an open space therebetween for receiving and holding plugs. The wall is connected to the first fixed end. The cover may further comprise opposing sidewalls and front and rear end portions, with the sidewalls comprising a concave surface sloping downwardly into one of the rear and front end portions.

In still yet another embodiment, the plug locking assembly comprises tandem plug holders comprising first and second sets of opposing top and bottom arms, a central wall positioned between the tandem plug holders and a cover. The top and bottom arms extend from a first fixed end to a second free end and define open spaces therebetween for receiving and holding plugs. The central wall is connected to the first fixed ends of the top and bottom arms and positioned transversely thereto. The cover comprises opposing sidewalls and front end and rear end portions, with the opposing sidewalls comprising opposing concave surfaces. At least a portion of the concave surfaces may be positioned above and in alignment with the open spaces The plug locking assembly may also incorporate various other features. A surface of at least one of the top and bottom arms may, for example, comprise a ramp. When a retaining wall is present, it may comprise a stop surface and/or an angled surface. When a cover is present, it may define two or more tool insertion slots for receiving a plug removal tool and include front end and rear end portions with a bottom surface of the front end portion lying in a different plane than all of said rear end portion. The plug locking assembly may comprise two adjacent plug holders positioned in tandem for receiving two plugs. In addition, a surface of at least one of the top and bottom arms may comprise a depression geometrically conforming to at least a portion of the plugs.

BRIEF DESCRIPTION OF THE DRAWINGS

FIG. 6A is a perspective view of a tool being used to insert plugs contained in one embodiment of the plug locking assembly of the present invention into a receptacle just before insertion;

FIG. 6B is a perspective view of FIG. 6A with the plugs at the point of insertion;

FIG. 7A is a perspective view of plugs in a receptacle held in one embodiment of the plug locking assembly of the present invention and the tool of FIG. 6A rotated 180 degrees for removing said plugs from said receptacle;

FIG. 7B is a perspective view of FIG. 7A, with the tool inserted into the slots of the plug locking assembly;

DETAILED DESCRIPTION OF THE INVENTION

Figure 1:
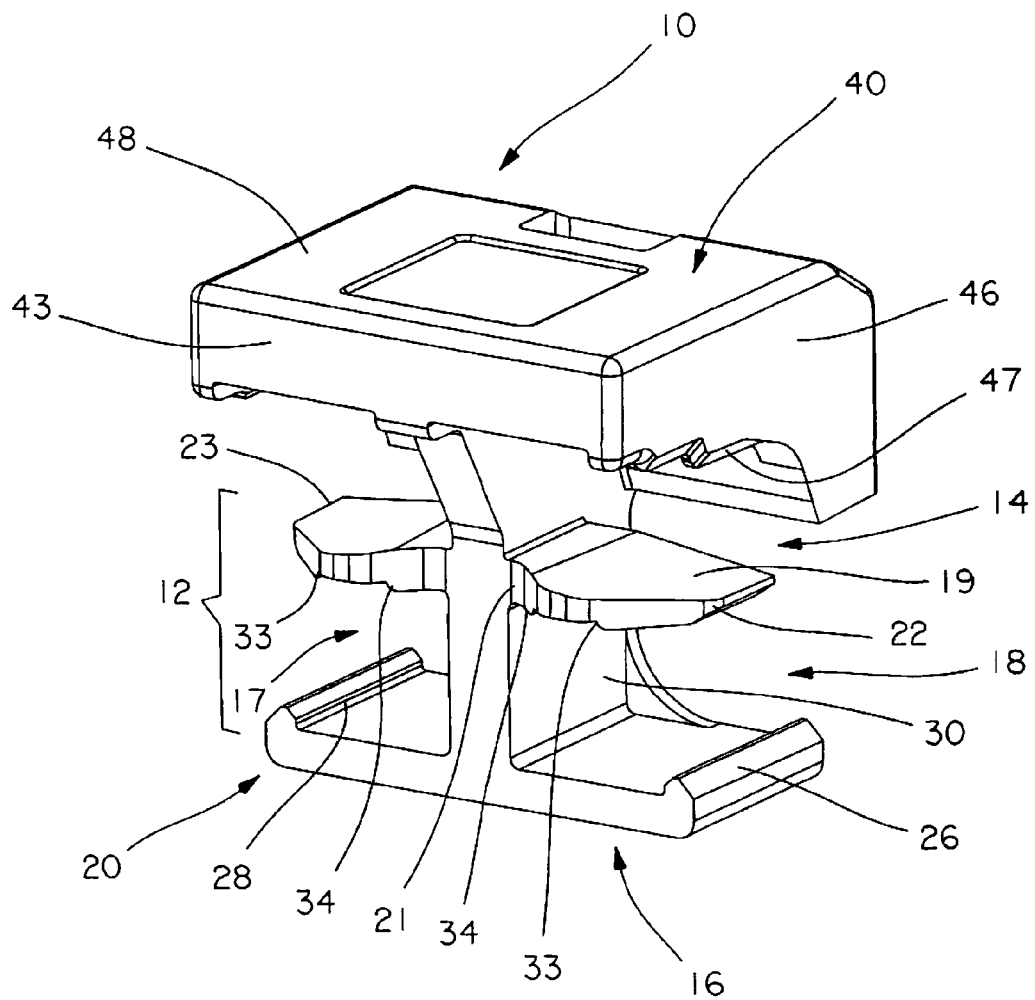
FIG. 1 is a rear perspective view of one embodiment of the plug locking assembly of the present invention.
Figure 2:
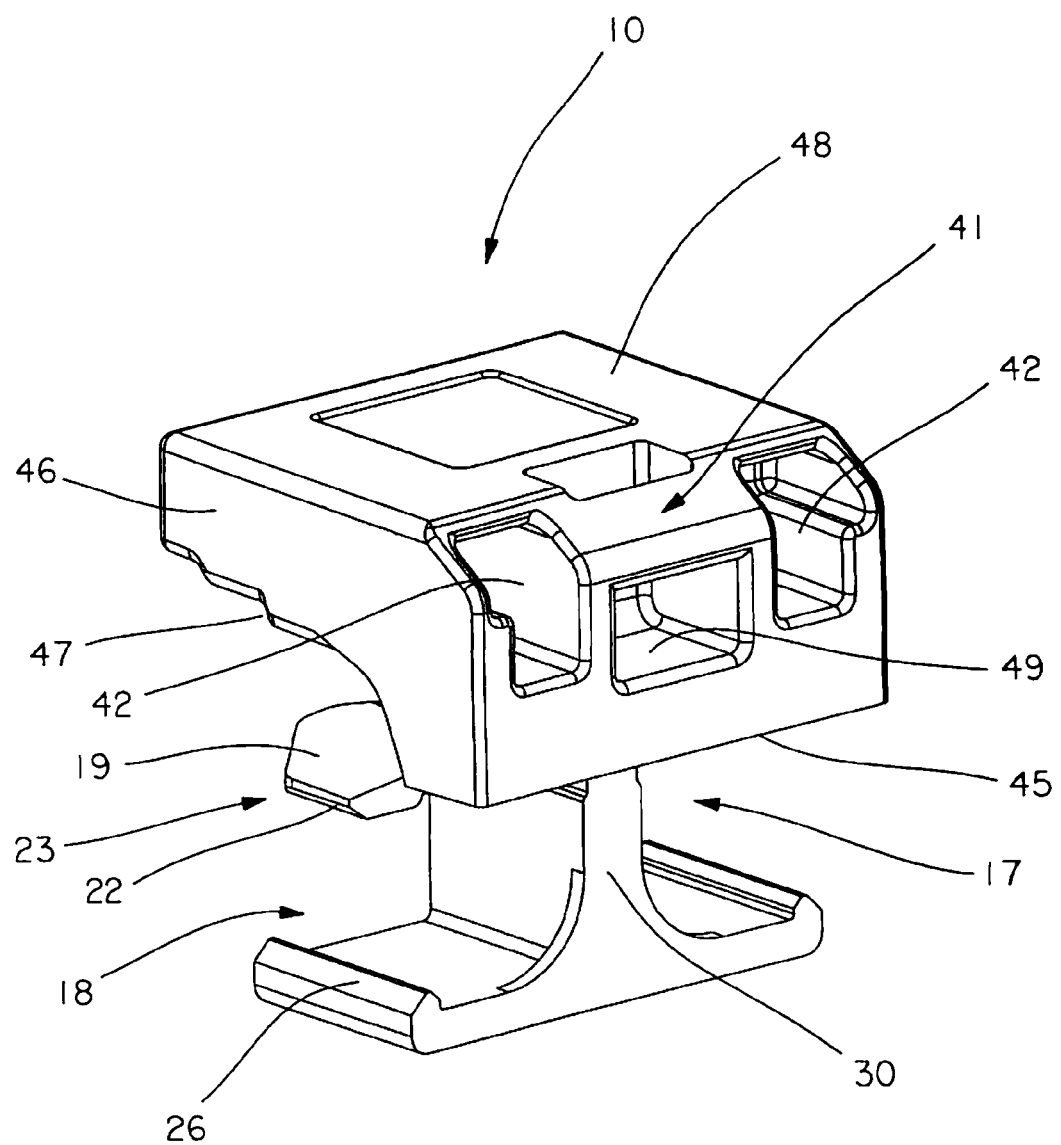
FIG. 2 is a front perspective view of the plug locking assembly of FIG. 1.
Figure 3:
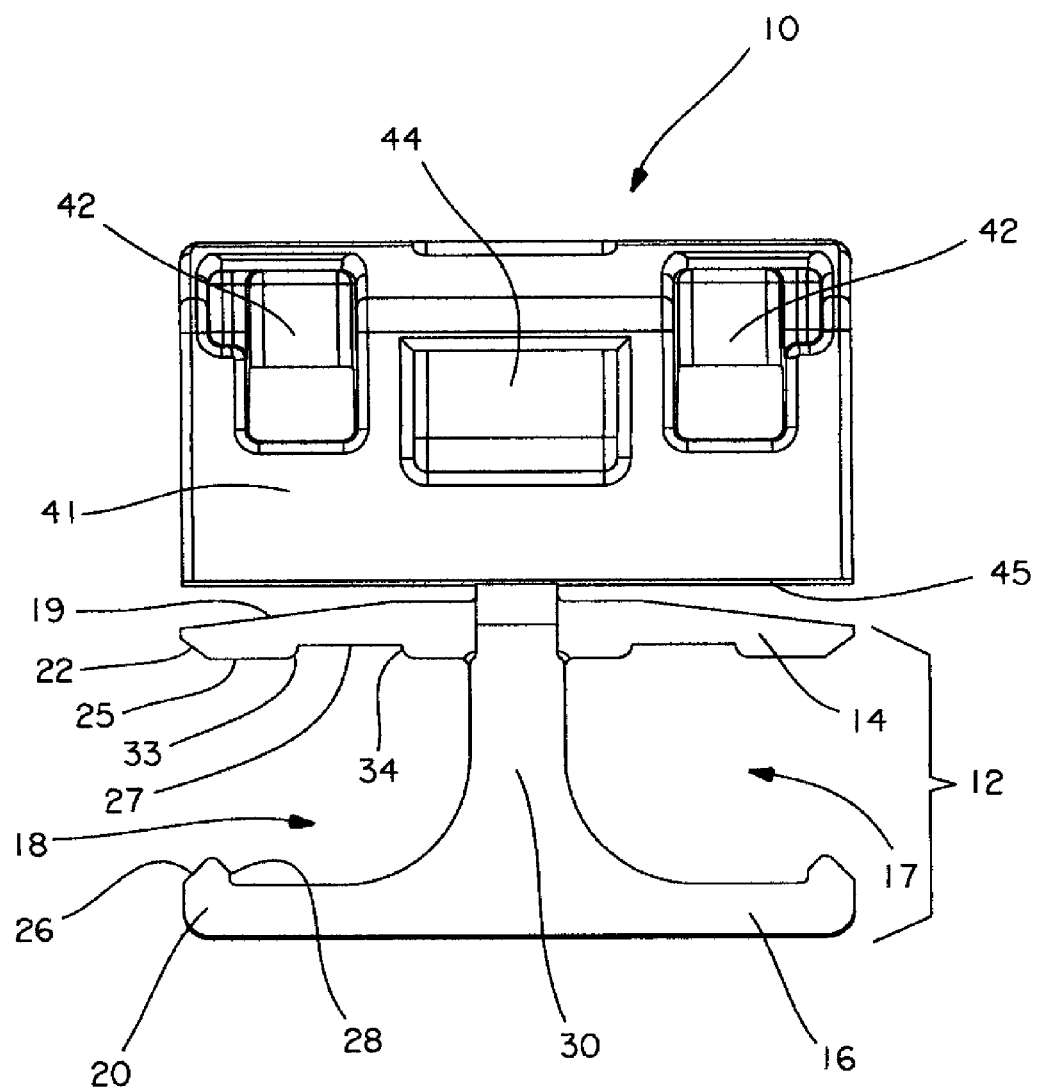
FIG. 3 is a front end view of the plug locking assembly of FIG. 2.

Referring now to FIGS. 1-3, plug locking assembly 10 comprises at least one plug holder 12, central wall 30 positioned between plug holder 12, and cover 40. Plug locking assembly 10 may be constructed by injection molding or machining processes well known to those skilled in the art, and may be constructed of plastic, metal, or any other moldable or machinable material.

Figure 4A:
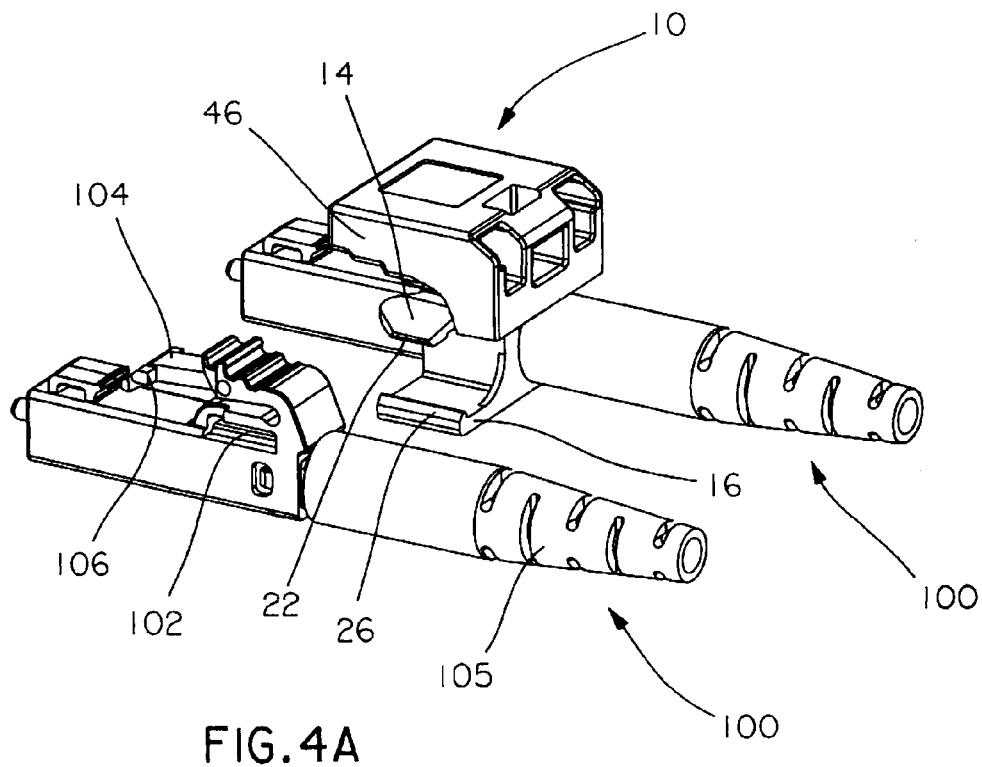
FIG. 4A is a perspective view of a first plug inserted into the plug locking assembly of FIG. 1 and a second plug adjacent the locking assembly prior to insertion.

Plug holders 12 each comprise opposing top arms 14 and opposing bottom arms 16, each extending transversely from central wall 30 and defining first open spaces 17 therebetween. As used herein, the term "transverse" means intersecting at an angle, including but not limited to a 90 degree angle. First open spaces 17 receive and hold plugs. Top arms 14 comprise first fixed ends 21 connected to central wall 30 and second free ends 23 spaced apart from first fixed ends 21 and may taper in width as they extend from first fixed ends 21 to second free ends 23. First fixed ends 21 are connected to central wall 30. As seen most clearly in FIG. 3, second free ends 23 of top and bottom arms 14 and 16 define second open space 18 for side insertion of plugs and may comprise ramp 22 for ease of insertion of plugs, as described hereinbelow. As used herein, side insertion means that the plug may be inserted into and engaged by plug holders 12 from at least a sideways direction, as shown in FIG. 4A. Top surfaces 19 of top arms 14 slope downwardly toward bottom arms 16. Bottom surfaces 25 of top arms 14 comprise depression 27 defined by opposing sidewalls 33 and 34 in bottom surfaces 25 and sized and shaped to geometrically conform to a least a portion of plugs. Second free ends 23 of bottom arms 16 may comprise retaining walls 20 transverse to bottom arms 16 and comprising angled surfaces 26 to aid plug installation and stop surfaces 28 to retain plugs in position. When plug holders 12 are positioned in tandem, plug holders comprise first and second sets of top and bottom arms 14 and 16.

Cover 40 comprises tool insertion slots 42, central pull hook opening 44, sidewalls 46, and top wall 48. Cover 40 is designed to block topside access to latch 104 and to enable removal of plugs through use of removal tool 130. Cover 40 further comprises front end portion 41 and rear end portion 43. Bottom surface 45 of front end portion 41 may lie in a different plane than all of rear end portion 43. Sidewalls 46 may comprise concave surface 47, which slopes downwardly into at least one of front end and rear end portions 41 and 43. Sidewalls 46 help limit side access to the plug latch after the installation. Slots 42 may exhibit an L-shaped configuration and further comprise a plurality of slot configurations to allow unique keys to be provided to further limit access. Concave surfaces 47, when present, are provided to allow the depressed latch of a plug to pass underneath sidewalls 46 upon insertion or removal of a plug from assembly 10. At least a portion of concave surfaces 47 may be positioned above and in alignment with first open spaces 17.

Figure 4B:
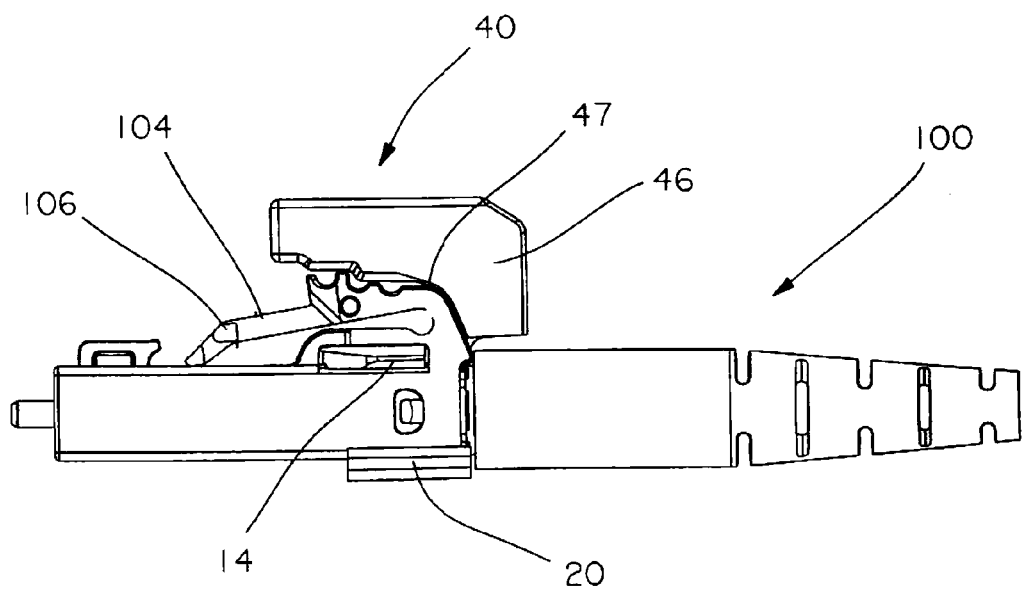
FIG. 4B is a side elevated view of the insertion shown in FIG. 4A.
Figure 5A:
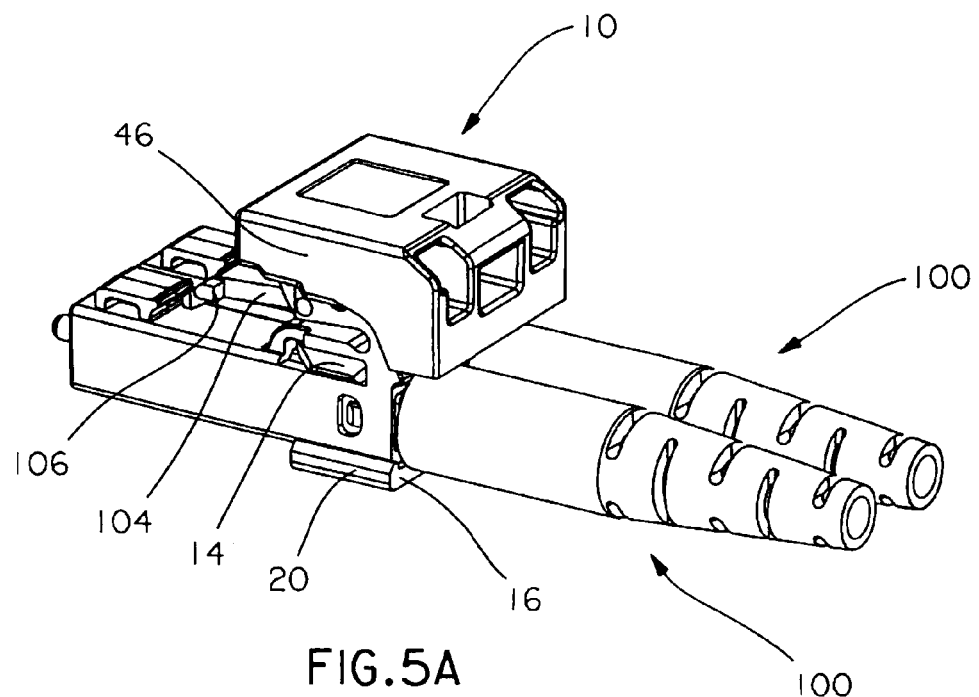
FIG. 5A is a perspective view of two plugs inserted in the plug locking assembly of FIG. 1.
Figure 5B:
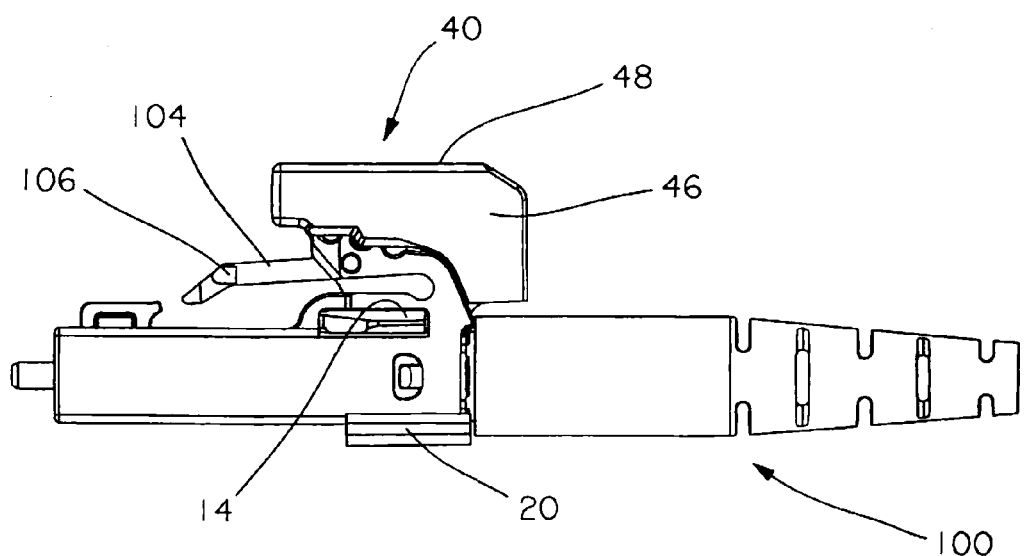
FIG. 5B is a side elevated view of FIG. 5A.

Referring to FIGS. 4A and 4B, plugs 100 are secured within plug holders 12 by depressing plug latch 104 and inserting plug 100 between top arms 14 and bottom arms 16 sideways. Plugs 100 comprise opening 102, latch 104, fiber receiving member 105 and clasp surface 106. Top arm 14 is inserted into opening 102 within plug 100, and bottom arm 16 is directed underneath the bottom of plug 100. As seen most clearly in FIG. 4B, plug latch 104 is depressed such that it will fit under concave surface 47 of cover 40 upon insertion. During insertion, surfaces of plug 100 ride over ramps 22 of top arm 14 and angled surfaces 26 of bottom arm 16, to slide into open spaces 17. When plug 100 is fully inserted into plug holder 12, it is held in place by top arm 14 and stop surface 28 as well as its placement within depressions 27. FIG. 5A shows the final assembly with two plugs 100 retained in tandem in plug locking assembly 10.

Once plugs 100 are secured within locking assembly 10, they may be inserted into receptacle 120, comprising receptacle latch surface 122, manually. In installations where space constraints make manual insertion difficult, tool 130, which comprises prongs 132 and pull hook 134, may be used to insert the assembled apparatus into receptacle 120. Additional details concerning tool 130 are shown and described in co-pending, co-owned U.S. patent application Ser. No. 11/207,853, which is hereby incorporated by reference in its entirety.

Figure 6C:
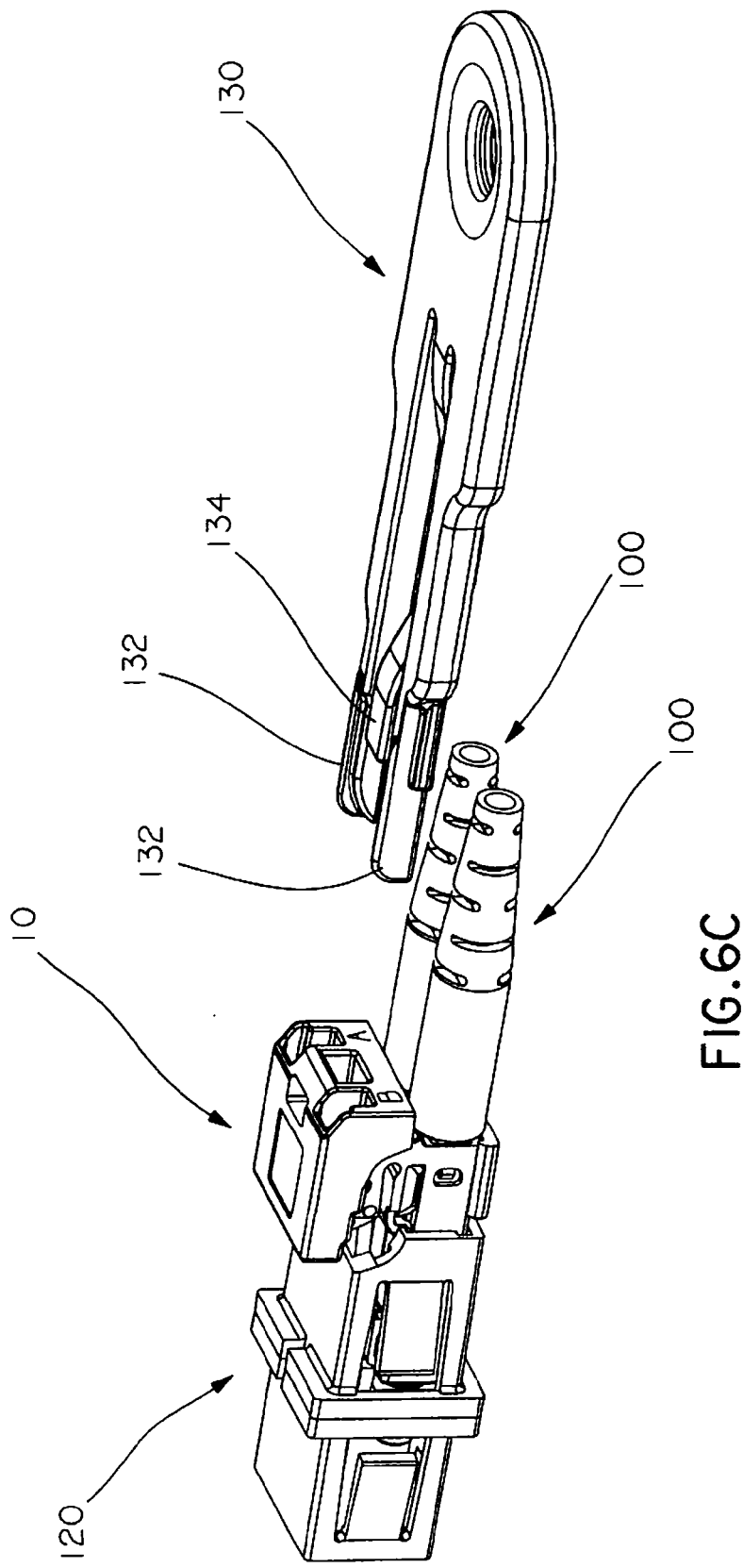
FIG. 6C is a perspective view of FIG. 6A after insertion of the plugs into the receptacle.
Figure 7C:
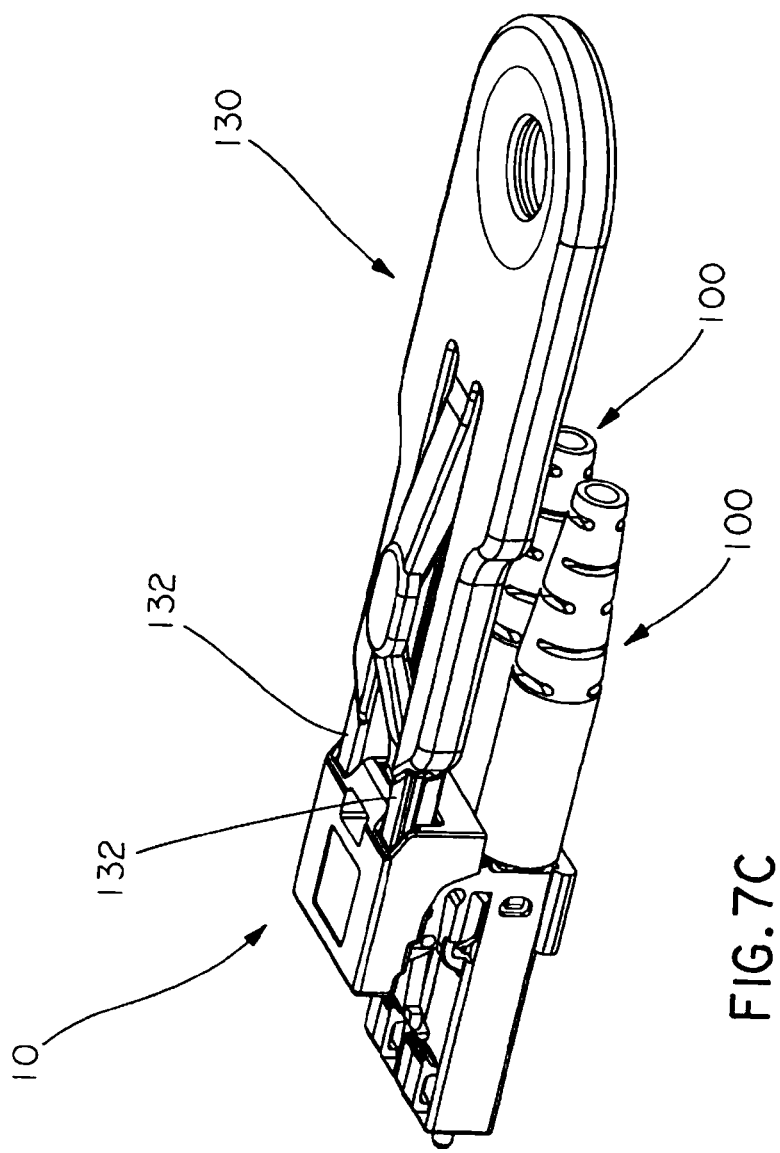
FIG. 7C is a perspective view of FIG. 7A, with the tool engaged with the plug locking assembly and removing the plugs from the receptacle.
Figure 7C:
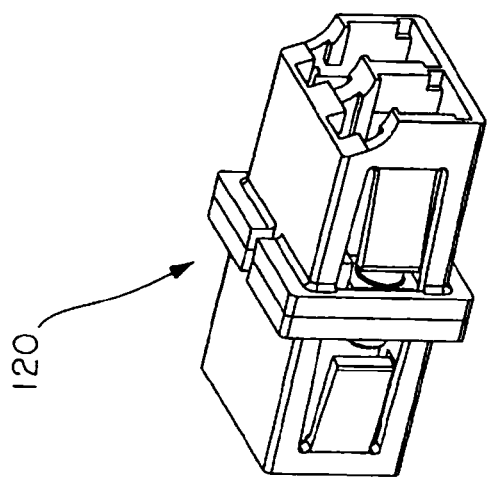
Figure 8A:
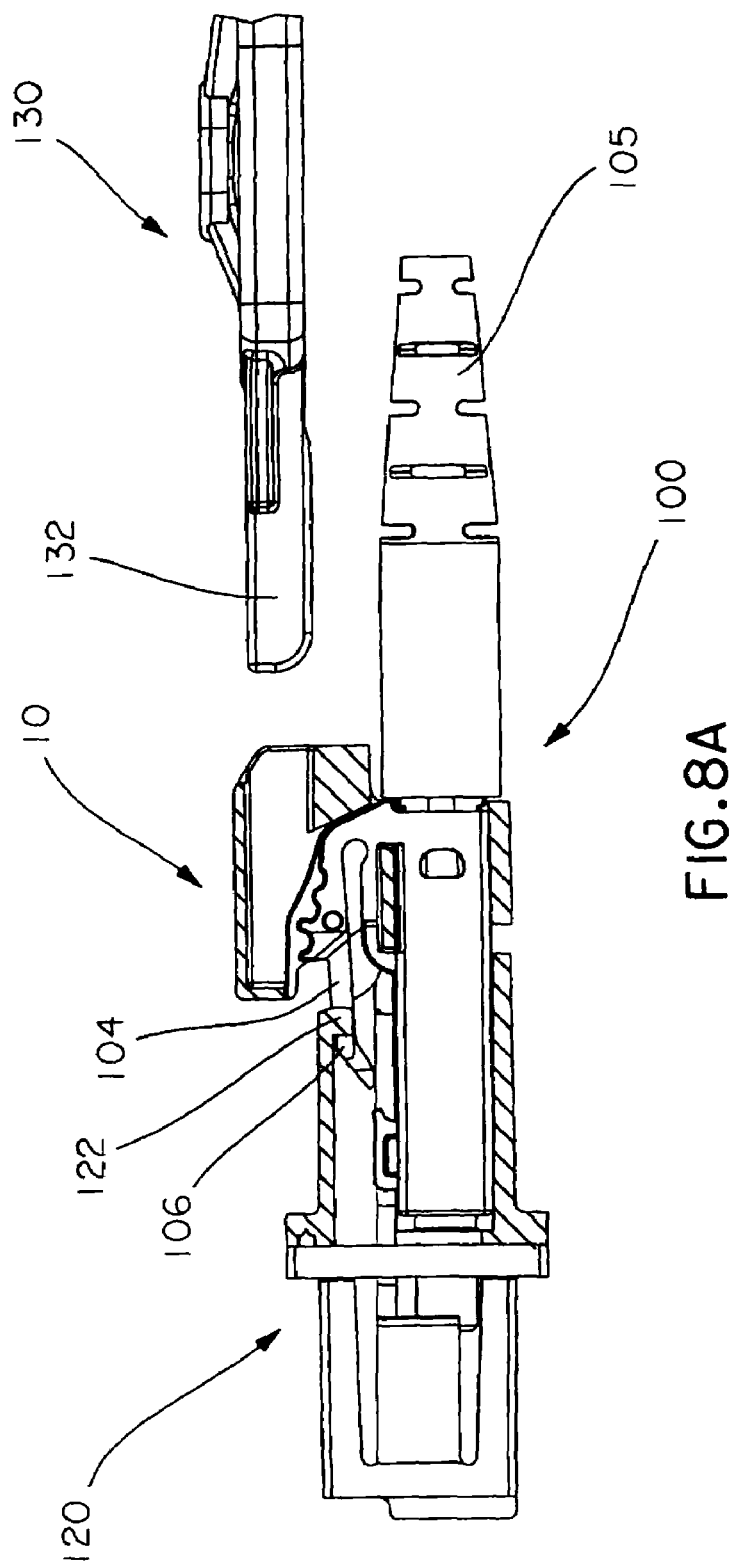
FIG. 8A is a cross-section of the receptacle and the plug locking assembly shown in FIG. 7A.
Figure 8B:
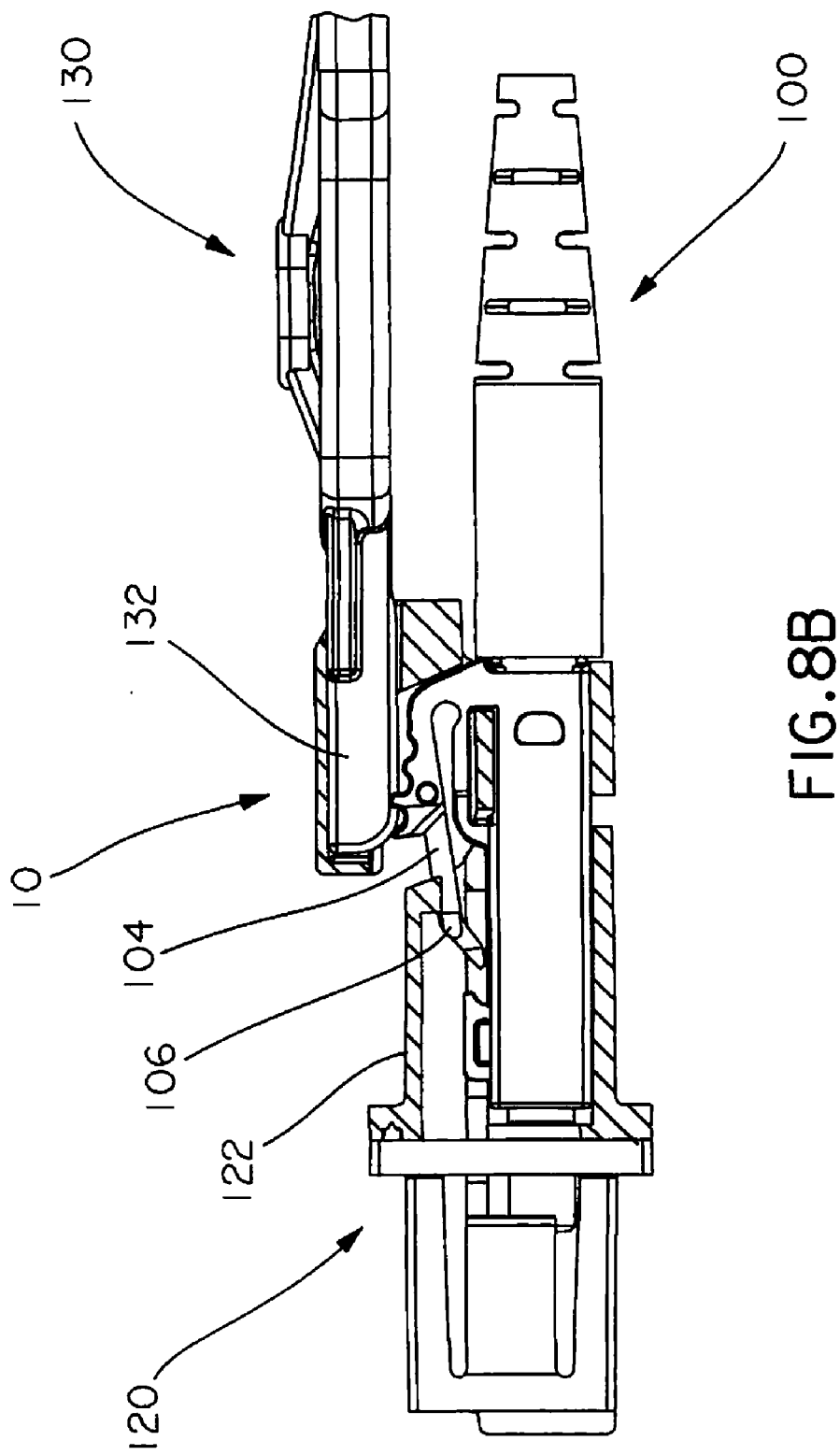
FIG. 8B is a cross-section of the receptacle and the plug locking assembly shown in FIG. 7B, showing the operation of the tool.
Figure 8C:
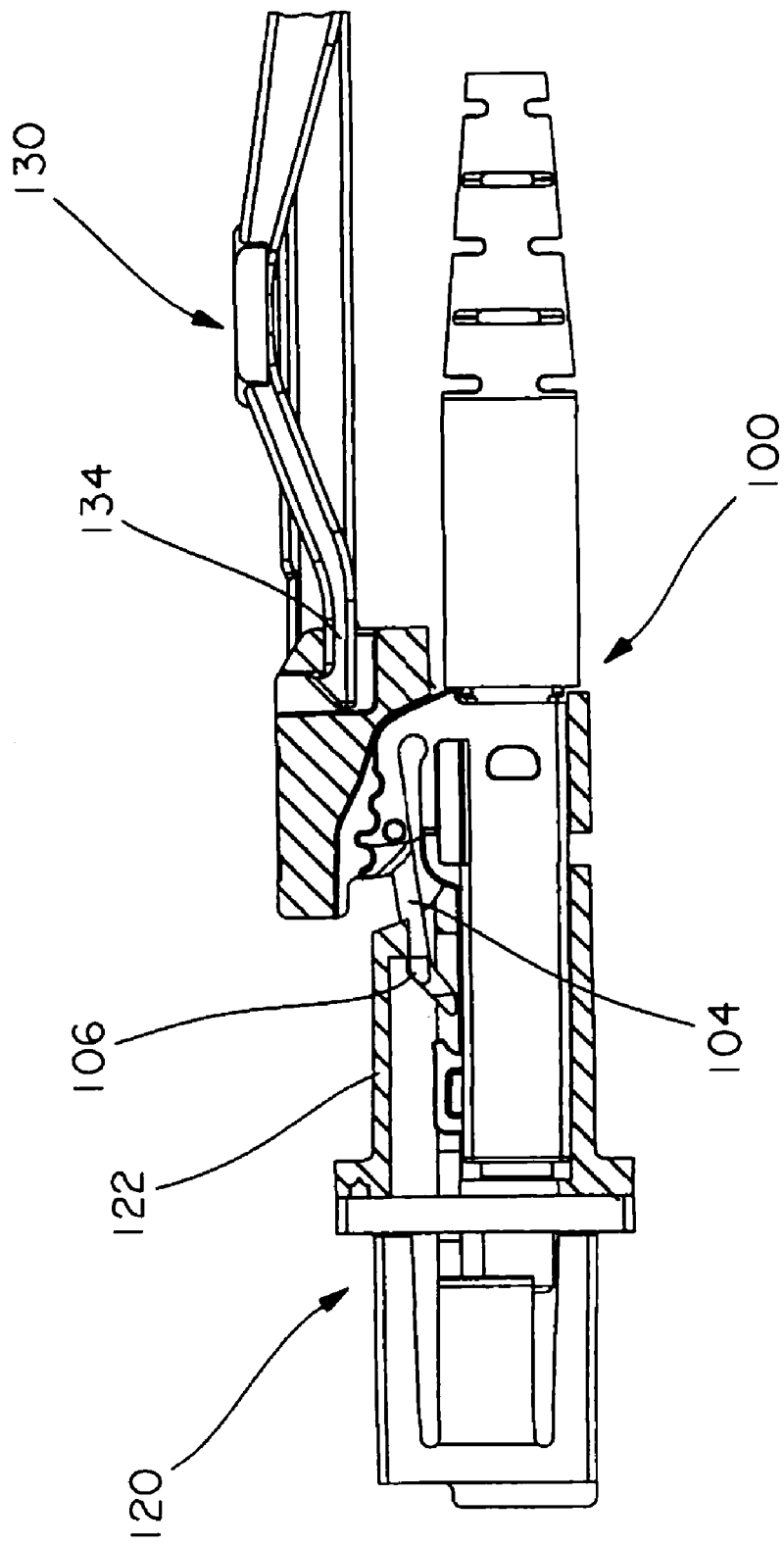
FIG. 8C is a cross-section of the receptacle, plug locking assembly, and tool of FIG. 7C, showing the engagement of the tool with the assembly.

FIGS. 6A-C illustrate use of tool 130 for insertion of plugs 100 into receptacle 120. Tool 130 is inserted into assembly 10 with pull hook 134 positioned in a downward orientation. FIG. 6A shows the relation of tool 130, plug locking assembly 10, plugs 100, and receptacle 120 just prior to insertion of plugs 100 into receptacle 120. Prongs 132 of tool 130 are inserted into insertion slots 42 of cover 40, but pull hook 134 remains outside pull hook opening 44 of cover 40. Tool 130 is pushed forward until plugs 100 are inserted into receptacle 120, as shown in FIG. 6B. Tool 130 is then removed, as shown in FIG. 6C, leaving plugs 100 engaged within receptacle 120 and protected from unintended disconnection and tampering by cover 40. In the final assembled position, latches 104 of plugs 100 are covered by top wall 48 and side walls 46 of cover 40, thereby preventing their depression and activation, as shown in FIG. 6C.

Removal of plugs 100 from receptacle 120 and plug holder may be achieved through tool 130. FIGS. 7A-C and 8A-C illustrate use of tool 130 for this purpose. Tool 130 is inserted into assembly 10 with pull hook 134 positioned in an upward orientation. Prongs 132 are inserted into insertion slots 42, and pull hook 134 is inserted into pull hook opening 44 of cover 40. Prongs 132 depress latches 104, removing clasp surface 106 from contact and interference with receptacle latch surface 122, enabling the manual removal of plugs 100 from receptacle 120. These operations are shown in cross-section in FIGS. 8A (plug locked and inserted with tool approaching), 8B (tool inserted and latches 104 depressed), and 8C (pull hook 134 engaged during plug removal). Plugs 100 may be removed from assembly 10 by manually depressing latches 104 so they may pass under concave surfaces 47 and pulling plugs 100 out of plug holders 12.

What is claimed is:

1. A plug locking assembly comprising:
   at least one plug holder comprising top and bottom arms comprising first and second ends, said top and bottom arms defining a first open space therebetween for receiving and retaining one or more plugs;
   a depression in a surface of at least one of said top and bottom arms, said depression defined by opposing sidewalls positioned between said first and second ends and sized and shaped to geometrically conform to at least a portion of said plugs;
   a retaining wall transverse to at least one of said first and second ends of said top and bottom arms, said retaining wall comprising a stop surface for retaining said plugs in position after insertion;
   a wall transverse to said top and bottom arms and connected to one of said first and second end; and a cover overlying said at least one plug holder, said cover defining two or more tool insertion slots for receiving a plug removal tool.

2. The plug locking assembly of claim 1, wherein a surface of at least one of said top and bottom arms comprises a ramp.

3. The plug locking assembly of claim 1, wherein said retaining wall comprises an angled surface.

4. The plug locking assembly of claim 1, wherein said cover comprises front end and rear end portions, with a bottom surface of said front end portion lying in a different plane than all of said rear end portion.

5. The plug locking assembly of claim 1, wherein said cover comprises opposing sidewalls and front and rear end portions, at least one of said opposing sidewalls comprising a concave surface sloping downwardly into one of said rear and front end portions.

6. The plug locking assembly of claim 1, wherein said first ends are fixed to said wall and second ends are free, said second free ends defining a second open space for side insertion of said plugs.

7. A plug locking assembly comprising:
   at least one plug holder comprising a top arm and a bottom arm, said top and bottom arms defining a first open space for receiving and holding one or more plugs, each of said top and bottom arms extending from a first fixed end to a second free end, said second free ends of said top and bottom arms defining a second open space for side insertion of said plugs;
   a wall transverse to said top and bottom arms and connected to said first fixed end; and
   a cover overlying said at least one plug holder, said cover for blocking topside access to said plugs after insertion and comprising opposing sidewalls and front and rear end portions, at least one of said opposing sidewalls comprising a concave surface sloping downwardly into at least one of said front and rear end portions, said concave surface for allowing said plugs to pass under said opposing sidewalls during said side insertion.

8. The plug locking assembly of claim 7, wherein a surface of at least one of said top and bottom arms comprises a ramp.

9. The plug locking assembly of claim 7, wherein a surface of at least one of said top and bottom arms comprises a depression defined by opposing sidewalls positioned between said first and second ends, said depression geometrically conforming to at least a portion of said plugs.

10. The plug locking assembly of claim 7, wherein at least one of said second ends of said top and bottom arms comprises a retaining wall comprising a stop surface for retaining said plugs in position after insertion.

11. The plug locking assembly of claim 7, wherein at least a portion of said concave surface is positioned above and in alignment with said first open spaces.

12. The plug locking assembly of claim 7, wherein said cover defines two or more tool insertion slots for receiving a plug removal tool.

13. The plug locking assembly of claim 7, wherein said cover comprises front end and rear end portions, with a bottom surface of said front end portion lying in a different plane than all of said rear end portion.

14. A plug locking assembly comprising:
   at least one plug holder comprising top and bottom arms, said top and bottom arms extending from a first fixed end to a second free end and defining an open space therebetween, said open space for receiving and holding one or more plugs;
   a wall transverse to said top and bottom arms and connected to said first fixed end; and
   a cover overlying said at least one plug holder, said cover for blocking topside access to said plugs and comprising opposing sidewalls and front and rear end portions, at least one of said opposing sidewalls comprising a concave surface sloping downwardly into at least one of said front and rear end portions.

15. The plug locking assembly of claim 14, wherein a surface of at least one of said top and bottom arms comprises a ramp.

16. The plug locking assembly of claim 14, wherein a surface of at least one of said top and bottom arms comprises a depression geometrically conforming to at least a portion of said plugs.

17. The plug locking assembly of claim 14, wherein at least one of said second ends of said top and bottom arms comprises a retaining wall comprising a stop surface for retaining said plugs in position after insertion.

18. The plug locking assembly of claim 14, wherein at least a portion of said concave surface is positioned above and in alignment with said open space.

19. The plug locking assembly of claim 14, wherein said cover defines two or more tool insertion slots for receiving a plug removal tool.

20. The plug locking assembly of claim 14, wherein said cover comprises front end and rear end portions, with a bottom surface of said front end portion lying in a different plane than all of said rear end portion.

21. A plug locking assembly comprising:
   tandem plug holders comprising first and second sets of opposing top and bottom arms, said top and bottom arms extending from a first fixed end to a second free end and defining open spaces therebetween, said open spaces for receiving and holding plugs;
   a central wall positioned between said tandem plug holders, said central wall connected to said first fixed ends of said top and bottom arms and positioned transversely thereto; and
   a cover comprising opposing sidewalls and front end and rear end portions, said opposing sidewalls comprising opposing concave surfaces, with at least a portion of said concave surfaces positioned above and in alignment with said open spaces.

* * * * *